United States Patent Office 3,472,919
Patented Oct. 14, 1969

3,472,919
HYDROXYL CONTAINING POLYTERTIARY PHOSPHATES AND PROCESS FOR PRODUCING SAME
Georges Nagy, Montrouge, and Daniel Baldé, Issy-les-Moulineaux, France, assignors, by mesne assignments, to Ugine Kuhlmann (societe anonyme), Paris, France, a corporation of France
No Drawing. Filed Aug. 4, 1965, Ser. No. 477,305
Claims priority, application France, Aug. 13, 1964, 985,109, Patent 1,411,875
Int. Cl. C07f 9/08; C08g 22/08; C08k 1/60
U.S. Cl. 260—928          10 Claims

ABSTRACT OF THE DISCLOSURE

A method of preparing tertiary phosphoric acid esters or polyesters containing at least two hydroxyl groups in their molecule, by transesterification-polycondensation of a tertiary phosphate possessing 1 to 3 hydroxyl groups and of a polyhydroxylated organic compound and the application of the compounds which are produced by the inventive process of the production of polyurethane foams, as constituents of lubricants and transfer liquids, and as crosslinking agents for plastic materials.

PRIOR ART

United States Patent No. 2,909,559 mentioned that dialkylhydroxyalkyl phosphates underwent, under reduced pressure and at temperatures between 90° and 250° C., a polycondensation with liberation of a monofunctional alcohol and the formation of a phosphoric polyester comprising a hydroxyl group, according to the Equation 1:

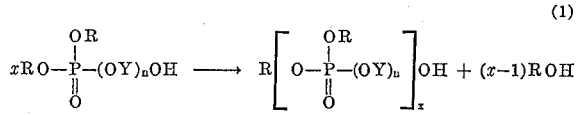

(1)

Futhermore, it is likewise known, particularly from French Patent No. 1,198,449 of Jan. 17, 1958 that the transesterification of trialkyl phosphates by divalent and polyvalent alcohols leads to more or less crosslinked phosphoric polyesters.

Moreover, French Patent No. 1,393,549 issued on Feb. 15, 1965 describes the preparation of phosphoric polyesters comprising at least three alcoholic hydroxyl groups by polycondensation of phosphonated triols, obtained by oxyalkylation of phosphoric acid according to the Equation 2

$O = P[(OY)_nOH]_3 \longrightarrow H(OY)_n$

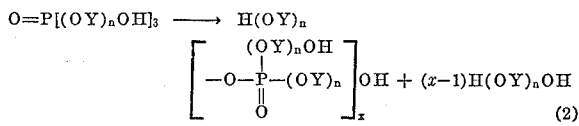
(2)

As was described in the French patent which has just been quoted, phosphorated triols having at the same time phosphoric ester bonds and alcoholic hydroxyl groups behave like bifunctional compounds and their intermolecular polycondensation leads to a polyester with the liberation of a diol.

THE INVENTION

The invention utilises (1) at least one tertiary phosphoric ester containing 1 to 3 hydroxyl groups and complying with the general Formula I:

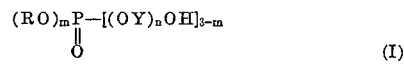

(I)

in which R designates an alkyl, cycloalkyl, mono- or dihaloalkyl or aryl group having from 1 to 6 carbon atoms, $m$ is equal to 0 or to an integer between 1 and 3, $n$ is between 1 and 10, and Y represents an alkylene radical of the formula

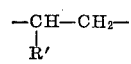

in which R' is a hydrogen atom or a methyl, ethyl, or halomethyl group which may be different in each of the Y groups, and (2) at least one hydroxylated organic compound of the formula A—OH, in which A is any organic radical, such as diols, triols, or polyols, which may contain mineral elements as substituents or as heteroatoms.

As compound 2 it is also possible to use a mixture of polyols or a mixture of polyols and monofunctional alcohols.

The process according to the invention is characterised in that a transesterification-polycondensation is effected by heating the mixture of hydroxylated phosphate of Formula I and of the hydroxylated organic compound of Formula A—OH under reduced pressure, preferably in a vacuum of the order of 1–100 mm. Hg, at temperatures between 90° and 250° C. and distilling the resulting alcohol or diol as it is formed.

The applicants have in fact found that when the polycondensation of a tertiary phosphoric ester containing from 1 to 3 hydroxyl groups, of Formula I, is effected in the presence of hydroxylated organic compound A—OH, the homopolycondensation of the hydroxylated phosphoric ester according to the general formula:

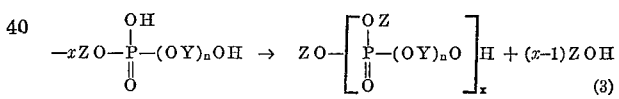

(3)

where Z designates the radical R or the group —(YO)$_n$H previously defined, is accomplished by transesterification between the ester group of the phosphate and the alcohol group of the hydroxylated compound, and more or less condensed mixed phosphoric esters are obtained.

At moderate condensation rates the condensate is a viscous liquid soluble in polar solvents and of essentially linear structure (II)

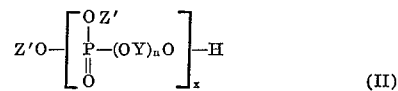

(II)

where Y and $n$ have the same meanings as previously, $x$ is an integer between 2 and 10, and Z' represents either the group —(YO)$_n$ H or the —R group defined above, or else the —A residue of the hydroxylated organic compound, at least one of the Z' groups representing said residue A.

In the process according to the invention it is advantageous to utilise a hydroxylated organic compound having a higher boiling point than that of the alcohol and of the diol formed.

As a general rule, the transesterification-polycondensation according to the invention are effected without it being necessary to utilise a catalyst, but in certain cases the addition of an acid catalyst, such as phosphoric acid, or of a Friedel-Crafts catalyst such as aluminum chloride, stannic chloride, dibutyltin dichloride, titanium chloride (IV), or an orthotitanic ester, or of boron trifluoride, is found advantageous.

As examples of hydroxylated phosphoric esters suitable for use in the process of the invention, are, among others the phosphorus containing triols obtained by reacting an alkylene oxide with phosphoric acid, the mixture of phosphoric esters prepared by reacting an alkylene oxide with a mixture of mono- and dialkyl phosphoric acids, which themselves are obtained in known manner, by action of a monoalcohol preferably having from 1 to 5 carbon atoms on the phosphoric anhydride, according to the reaction (4)

(4) 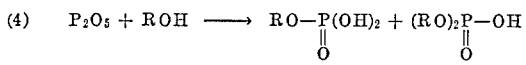

R having the meaning defined previously.
The alkylene oxide used has the formula:

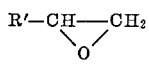

where R' is a hydrogen atom or a methyl, ethyl, or halomethyl group, such as ethylene oxide, propylene oxide, glycerol epichlorohydrine or epibromohydrine, or mixtures thereof.

It is known that the reaction of an alkylene oxide with phosphoric acid and of its partial esters is a self-catalysed reaction. The poly addition of the epoxide on the alcoholic groups is catalysed intramolecularly by a free acid function. The catalytic effect ceases when the terminal alcoholic groups is too far from the last acid P-OH function, which is then neutralised, by the addition of a single alkylene oxide molecule, so that in the resulting hydroxylated phosphoric esters of the Formula I

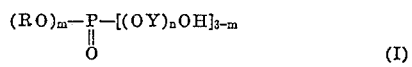

one of the $(3-m)$ groups is always a residue of monoalkylene glycol —OYOH.

In the transesterification-polycondensation, when it occurs with the formation of a diol, monoalkylene glycol is formed, if not exclusively at least with a clear predominance.

Among the linear hydroxylated organic compounds which can be utilised in the condensation process according to the invention, are (without this enumeration being limitative), the heavy alcohols, for example fatty alcohols or synthetic branched alcohols containing at least 10 carbon atoms, monoethers of glcyols such as methoxy-ethoxy-ethoxyethanol (methyltriglycol), butoxyethoxyethanol, and the mono-esters of polyethylene or polypropylene glycol, the mono- or dihalo-substituted alkanols, such as 2,3 dibromopropanol, aminoalcohols such as mono- or disubstituted aminoethanols, diols such as butane-diol-1,4, tri- and hexa-methylene glycols, 2-methylpentane-diol-2,4 (hexylene glycol), 2,2-dimethylpropanediol-1,3 (neopentylglycol), 2-methyl 2-ethyl propanediol-1,3 (neohexylene glycol), thiodiglycol, sulphonyl diglycol, diethanolamine, tetrachlorobutanediol-1,4, products of oxyalkylation of di-phenols, for example oxypropylated bisphenol A, dialkyl-silanediols, polysiloxanes, and polyols such as glycerine, trimethylolpropane, pentaerythrite, sorbitol, mannitol, α-methyl glucoside, saccharose, their oxyalkylation products, triethanolamine, and tetra-hydroxy-isopropyl ethylenediamine or mixtures thereof.

The phosphorus containing polyols obtained by the transesterification-polycondensation process according to the invention between a tertiary phosphoric ester containing from 1 to 3 hydroxyalkyl groups —(OY)$_n$OH and a polyol such as trimethylolpropane, pentaerythrite, sorbitol, α-methyl-glucoside, or the oxyalkylated products thereof have been found to be interesting products as polyols for the preparation of fire-proof polyurethane foams.

These phosphorus containing polyols react by their hydroxyl groups on the isocyanate groups and are thus incorporated in the polymer; because of their multi-functional nature, they promote the cross-linking of the latter, which makes them particularly suitable for the preparation of rigid foams.

The transesterification-polycondensation according to the invention makes it possible to vary the functionality and the hydroxyl number of the polyol in an easy manner and practically at will. It also makes it possible to incorporate, in the phosphorus containing or possibly phosphorus and halogen containing polyol, other mineral elements such as nitrogen, the presence of which may contribute in increasing the fireproofing power of the polyol.

The compounds prepared by the invention are likewise useful as cross-linking agents for plastic materials and as constituents of lubricants and of transfer liquids.

The invention is illustrated, without in any way being limited, by the following examples of the performance of the polycondensation-transesterification process for producing phosphorated polyols.

Example 1

A mixture of 134 g. (1 mol) of trimethylolpropane and 445 g. (1 mol) of a phosphorus containing triol, prepared by the addition of 6.0 mols of propylene oxide to 1 mol of anhydrous phosphoric acid, was heated in a distillation apparatus, under a vacuum of 1 mm. Hg, while bubbling nitrogen and progressively raising the temperature from 70° to 140° C. In 3 hours 113 g. of a mixture of propylene glycols composed of:

|  | G. |
|---|---|
| Monopropylene glycol (0.47 mol) | 36 |
| Dipropylene glycol (0.25 mol) | 33 |
| Tripropylene glycol (0.21 mol) | 44 | were distilled.

460 g. of a slightly yellow viscous liquid residue, composed of a phosphorus containing polyol, were obtained. This polyol had the following characteristics:

| Acid number | 2.5 |
|---|---|
| Hydroxyl groups per kg. | 9 |
| Phosphorus content percent | 6.8 |

A perfectly neutral product can be obtained by treating this polyol for one hour at 100° C. with 1.5 g. of propylene oxide.

Example 2

Following the process indicated in Example 1, a mixture composed of 134 g. (1 mol) of trimethylolpropane and 450 g. (1 mol) of a phosphorus containing triol prepared by addition of 8.0 mols of ethylene oxide to 1 mol of anhydrous phosphoric acid was transesterified. The reaction was continued until 186 g. of a mixture of ethylene glycols was eliminated. This mixture was composed of:

|  | G. |
|---|---|
| Monoethylene glycol (0.91 mol) | 56.5 |
| Diethylene glycol (0.40 mol) | 42.5 |
| Triethylene glycol (0.58 mol) | 87 |

395 g. of residue composed of a phosphorus containing polyol were obtained, having the following properties:

Slightly yellow viscous liquid.

| Acid number after oxypropylation | 0.3 |
|---|---|
| Hyroxyl groups per kg. | 5.6 |
| Phosphorus content percent | 7.9 |

Example 3

Following the process described in Example 1, a mixture composed of 82 g. (0.6 mol) of pentaerythritol and 445 g. (1 mol) of a phosphorus containing triol obtained by addition of 6.0 mols of propylene oxide to 1 mol of anhydrous phosphoric acid was transesterified. The reaction took 2 hours, during which 116 g. were collected of a mixture of propylene glycols composed of:

|  | G. |
|---|---|
| Monopropylene glycol (0.70 mol) | 53 |
| Dipropylene glycol (0.24 mol) | 32 |
| Tripropylene glycol (0.15 mol) | 31 |

410 g. of residue were obtained which was composed of a phosphorus containing polyol having the following characteristics:

Slightly yellow viscous liquid.
| Acid number after oxypropylation | 0.2 |
|---|---|
| Hydroxyl groups per kg. | 7.9 |
| Phosphorus content percent | 7.6 |

Example 4

Proceeding in a similar manner to Example 1, a mixture of 119 g. (0.8 mol) of triethanolamine and 445 g. (1 mol) of a phosphorus containing triol obtained by addition of 6.0 mols of propylene oxide to 1 mol of anhydrous phosphoric acid was transesterified. In 2½ hours 142 g. of a mixture of propylene glycols were eliminated, this mixture being composed of:

|  | G. |
|---|---|
| Monopropylene glycol (0.73 mol) | 55 |
| Dipropylene glycol (0.15 mol) | 39 |
| Tripropylene glycol (0.25 mol) | 48 |

420 g. of residue were collected which was composed of a polyol having the following properties:

Very viscous, orange-coloured liquid.
| Acid number after oxypropylation | 0.35 |
|---|---|
| Hydroxyl groups per kg. | 6.8 |
| Phosphorus content percent | 7.4 |
| Nitrogen content do | 2.7 |

Example 5

By the transesterification process described in Example 1, 429 g. (1 mol) of a phosphorus containing triol obtained by addition of 5.7 mols of propylene oxide to 1 mol of anhydrous phosphoric acid, and 480 g. of oxypropylated sorbitol prepared by addition of 5.14 mols of propylene oxide to 1 mol of sorbitol were reacted. Over a period of 5 hours 225 g. of a mixture of propylene glycols were distilled off, this mixture being composed of:

|  | G. |
|---|---|
| Monopropylene glycol (1.16 mols) | 88 |
| Dipropylene glycol (0.57 mol) | 76.5 |
| Tripropylene glycol (0.32 mol) | 60.5 |

684 g. of a residue were collected composed of a phosphorus containing polyol having the following characteristics:

Slightly yellow viscous liquid.
| Acid number after oxypropylation | 0.2 |
|---|---|
| Hydroxyl groups per kg. | 7.2 |
| Phosphorus content percent | 4.6 |

Example 6

By the process described in Example 1, 564 g. (1 mol) of a phosphorus and chlorine containing triol, obtained by addition of 5.0 mols of epichlorohydrine to 1 mol of anhydrous phosphoric acid, and 313 g. (0.75 mol) of oxypropylated pentaerythritol prepared by fixation of 4.85 mols of propylene oxide on 1 mol of pentaerythritol, were reacted. Over a period of 2 hours 110.5 g. of glycerol monochlorohydrine were distilled off. 766 g. of a residue composed of a phosphorated polyol having the following characteristics were collected:

Yellow viscous liquid.
| Acid number after oxypropylation | 0.3 |
|---|---|
| Hydroxyl groups per kg. | 9.2 |
| Phosphorus content percent | 4.1 |
| Chlorine content do | 18 |

Example 7

In a vacuum of 20 mm. of Hg and at a temperature between 130–150° C., 310 g. of a equimolecular mixture of oxypropylated mono- and dibutylphosphoric esters obtained by the action of 1 mol of phosphoric anhydride on 3 mols of n-butyl alcohol and then the fixation of 4.4 mols of propylene oxide on the mixture of butyl phosphoric acids thus prepared, was transesterified with 325 g. of oxypropylated soribtol obtained by addition of 8.05 mols of propylene oxide to 1 mol of sorbitol. Over a period of 7 hours a mixture composed of 66 g. (0.9 mol) of n-butanol and 31 g. (0.4 mol) of monopropylene glycol was distilled off. Finally, 538 g. of a residue composed of a phosphorus containing polyol were obtained which had the following characteristics:

Slightly yellow liquid of medium viscosity.
| Acid number after oxypropylation | 0.2 |
|---|---|
| Hydroxyl groups per kg. | 5.2 |
| Phosphorus content percent | 2.9 |

Example 8

In order to prepare a polyurethane foam, 2 g. of a polysiloxane, 1 g. of 1-2-4 trimethylpiperazine and 0.5 g. of a solution of lead naphthenate (about 30% in white spirit), and 35 g. of trichlorofluoromethane were dissolved, with good agitation, in 89 g. of the phosphorus containing polyol prepared in Example 1. 105 g. of technical methylene diphenylisocyanate (having 8 NCO groups per kg.) were then added to the preceding mixture. The mixture was agitated again and poured into a mould of 18 x 18 x 18 cm. A rigid foam block was obtained which had fine cells and a density close to 40 g. per litre.

The foam obtained contained about 2.6% of phosphorus; it was classified as non-inflammable by the test A.S.T.M. D1692–59T.

Example 9

Using the same method of operation and the same quantities of reagents as in Example 8, a rigid polyurethane foam was obtained with the aid of 101 g. of the phosphorated polyol prepared in Example 3. A rigid foam was obtained which had fine cells and a density close to 42 g. per litre.

This foam contained about 3.1% of phosphorus; it was classified as non-inflammable by the test A.S.T.M. D1692–59T.

Example 10

Utilising the same method of operation as in Example 8, a rigid polyurethane foam was prepared from 81 g. of the nitrogen and phosphorus containing polyol obtained in Example 4, 20 g. of an oxypropylated sorbitol (obtained by adding 5.14 mols of propylene oxide to 1 mol of sorbitol), 2 g. of a polysiloxane, 1 g. of trimethylpiperazine, 0.5 g. of a lead naphthenate solution (30% in white spirit), 35 g. of trichlorofluoromethane, and 105 g. of technical methylene diphenylisocyanate (having 8 NCO groups per kg.).

A rigid foam was obtained which had medium cells and a density close to 44 g. per litre.

This foam contained about 2.4% of phosphorus and 1.4% of nitrogen; it was classified as non-inflammable by the test A.S.T.M. D1692–59T.

Example 11

Utilising the same technique as in Example 8, a rigid foam was prepared from:

| | G. |
|---|---|
| Chlorine and phosphorus containing polyol prepared as in Example 6 | 55 |
| Oxypropylated sorbitol obtained by addition of 5.14 mols of propylene oxide to 1 mol of sorbitol | 41 |
| Polysiloxane | 2 |
| Trimethylpiperazine | 1 |
| Solution of lead naphthenate (30% in white spirit) | 0.5 |
| Trichlorofluoromethane | 35 |
| Technical methylene diphenylisocyanate (having 8 NCO groups per kg.) | 105 |

A rigid foam having fine cells and a density close to 42 g. per litre was obtained.

This foam contained about 0.94% of phosphorus and 4.1% of chlorine; it was classified as non-inflammable by the test A.S.T.M. D1692–59T.

Example 12

By the process described in Example 1, a mixture of 200 g. (1 mole) of isotridecylic alcohol obtained by oxo synthesis and 445 g. (1 mole) of a phosphorus containing triol obtained by addition of 6.0 moles of propylene oxide to one mole of anhydrous phosphoric acid was transesterified. Over a period of two hours and ending the reaction at 200° C. under a vacuum of 1 mm. Hg, a mixture of alcohols composed of 70 g. of monopropylene glycol (0.92 mole) and 60 g. of the initial oxo alcohol was eliminated. 512 g. of a residue composed of a phosphorus containing polyol were obtained which had the following characteristics:

Colourless limpid liquid of low viscosity.
Acid number after oxypropylation _____ 0.2
Hydroxyl groups per kg. _____ 4.1
Phosphorus content _____percent__ 2.9

Example 13

Using the same process as in Example 1, a mixture of 218 g. (1 mole) of 2,3 dibromopropane-1-ol and 445 g. (1 mole) of a phosphorus containing triol obtained by addition of 6.0 moles of propylene oxide to one mole of anhydrous phosphoric acid was transesterified. Over a period of two and a half hours a mixture composed of 72 g. of monopropylene glycol (0.94 mole) and 23 g. of dibromopropanol (0.15 mole) was eliminated. 554 g. of a phosphorus and bromine containing polyol were obtained which had the following characteristics:

Slightly yellow limpid viscous liquid.
Acid number after oxypropylation _____ 0.15
Hydroxyl groups per kg. _____ 3.65
Phosphorus content _____percent__ 5.6
Bromine content _____do____ 24.1

Example 14

A mixture of 122 g. (1 mole) of thiodiglycol and 445 g. (1 mole) of a phosphorus containing triol obtained by addition of 6.0 moles of propylene oxide to one mole of anhydrous phosphoric acid was transesterified in the same conditions as in Example 1. Over a period of three hours a mixture composed of 51 g. of monopropylene glycol (0.67 mole) and 37 g. of dipropyleneglycol was distilled off.

475 g. of a phosphorus and sulphur containing polyol were recovered which had the following characteristics:

Slightly yellow viscous liquid.
Acid number after oxypropylation _____ 0.25
Hydroxyl groups per kg. _____ 6.5
Phosphorus content _____percent__ 6.45
Sulphur content _____do____ 6.7

Example 15

A mixture of 109 g. (0.8 mole) of pentaerythritol and 445 g. (1 mole) of a phosphorus containing triol obtained by addition of 6.0 moles of propylene oxide to one mole of anhydrous phosphoric acid was transesterified in the presence of 38 g. of isopropyl orthotitanate. The reaction began at a lower temperature than in the absence of a catalyst (around 80° C.). Over a period of 2 hours, a mixture of propylene glycols composed of 68 g. of monopropylene glycol (0.89 mole), 41 g. of dipropylene glycol (0.31 mole) and 32 g. of tripropylene glycol (0.17 mole) was distilled off.

413 g. of residue consisting of a phosphorus containing polyol were obtained which had the following characteristics:

Yellow very viscous liquid.
Acid number after oxypropylation _____ 0.3
Hydroxyl groups per kg. _____ 3.4
Phosphorus content _____percent__ 7.45

A similar lowering of the reaction temperature was obtained when aluminum chloride, dibutyl tin dichloride or phosphoric acid, respectively were used as catalysts.

We claim:

1. Tertiary phosphoric esters having a substantially linear structure of the formula:

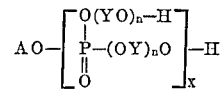

wherein Y is an alkylene group of the formula:

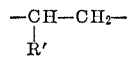

where R' is a member of the group consisting of the hydrogen atom and the methyl, ethyl, chloromethyl and bromomethyl which may be different in each of the Y-groups, $n$ is from 1 to 10, $x$ is an integer from 2 to 10 and A is the residue of a linear hydroxyl-containing organic compound AOH.

2. A method for the preparation of tertiary phosphoric esters, having at least two alcoholic hydroxyl groups, by transesterification-polycondensation of a tertiary phosphoric ester containing 1 to 3 hydroxyl groups and a linear hydroxylated organic compound, comprising the steps of heating a mixture of (1) a hydroxyl-containing phosphoric ester of the formula:

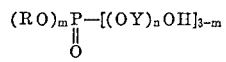

in which R is selected from the group consisting of alkyl, mono- and dichloroalkyl and mono- and dibromoalkyl of 1 to 6 carbon atoms and phenyl, $n$ is from 1 to 10, $m$ is an integer from 0 to 3, and Y is an alkylene group of the formula:

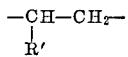

where R' is a member of the group consisting of the hydrogen atom and the methyl, ethyl, chloromethyl and bromomethyl which may be different in each of the Y-groups, with (2) linear said hydroxylated organic compound under a vacuum of from 1 to 100 mm. Hg, at temperatures from 90 to 250° C., whereby at least one alcohol member of the group consisting of mono- alcohols and diols, and a liquid residue of tertiary ester are obtained, and distilling off said alcohol as it is formed.

3. A method as claimed in claim 2, in which said hydroxyl containing organic compound used is a polyhydric alcohol.

4. A method as claimed in claim 2, in which said hydroxyl containing organic compound used is a mixture of polyols.

5. A method as claimed in claim 2, in which said hydroxyl containing organic compound is selected from the group consisting of 2,3-dibromopropanol and tetrachlorobutanediol-1,4.

6. A method as claimed in claim 2, in which said hydroxyl containing organic compound is selected from the group consisting of thiodiglycol and sulfonyldiglycol.

7. A method as claimed in claim 2, in which said hydroxyl containing compound includes heteroatoms selected from the group consisting of oxygen, nitrogen and sulfur.

8. A method as claimed in claim 2, in which said hydroxyl containing compound is a polyalkylene glycol.

9. A method as claimed in claim 2, in which said heating step is performed in the presence of phosphoric acid.

10. A method as claimed in claim 2, in which said heating step is performed in the presence of a Friedel-Crafts catalyst.

References Cited

UNITED STATES PATENTS

| | | | |
|---|---|---|---|
| 2,372,244 | 3/1945 | Adams et al. | 260—953 |
| 2,990,421 | 6/1961 | Melton et al. | 260—953 |
| 3,228,998 | 1/1966 | Fierce et al. | 260—928 |

CHARLES B. PARKER, Primary Examiner

ANTON H. SUTTO, Assistant Examiner

U.S. Cl. X.R.

252—49.8, 49.9, 78; 260—2.5, 234, 929, 953, 982